Oct. 21, 1958 L. R. THOMPSON 2,856,954
SAFETY VALVE
Filed Aug. 1, 1955
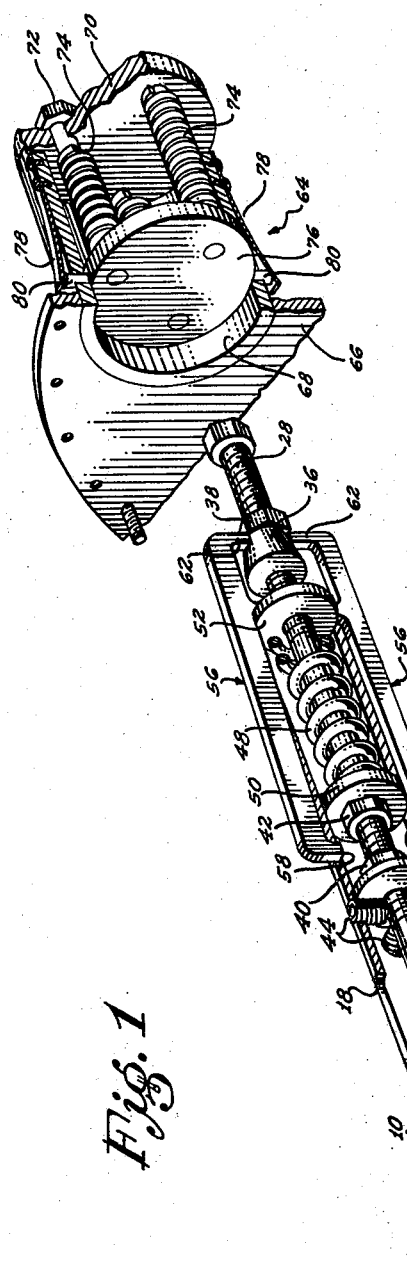
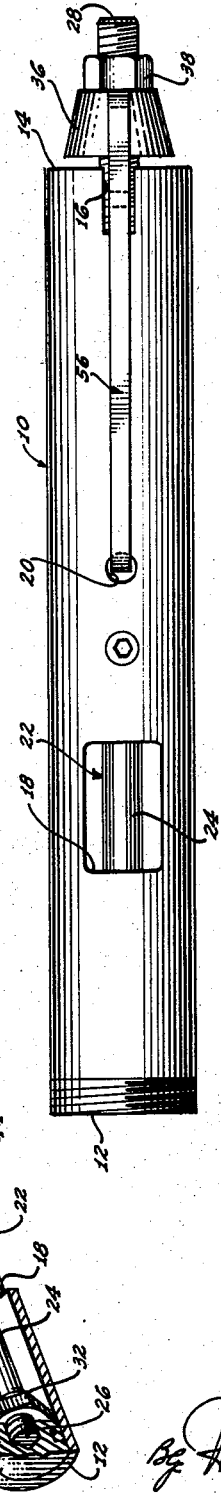
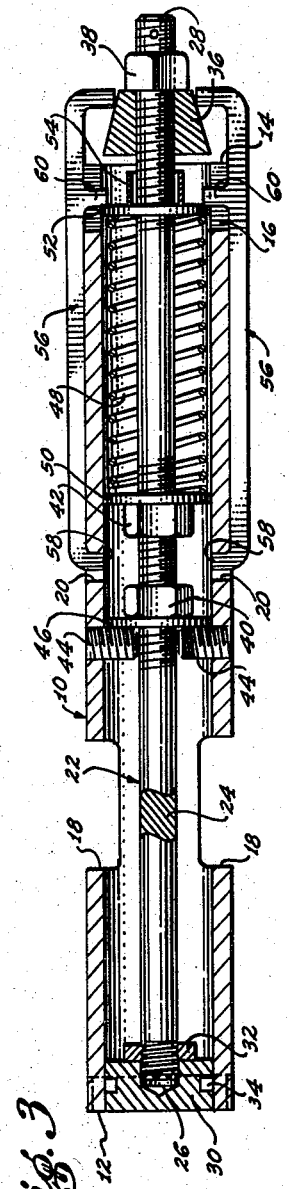
INVENTOR:
Leo R. Thompson

United States Patent Office 2,856,954
Patented Oct. 21, 1958

2,856,954
SAFETY VALVE

Leo R. Thompson, Lewistown, Mont., assignor to Northrop Aircraft, Inc., Hawthorne, Calif., a corporation of California Application August 1, 1955, Serial No. 525,665

5 Claims. (Cl. 137—467)

This invention has to do with hydraulics and pneumatics and more particularly with a safety valve that may be incorporated into either hydraulic or pneumatic systems.

Due to the continuing advances in the science of hydraulics and pneumatics and to the increasing pressures obtained in these areas of endeavors, reliable and quick acting safety valves are needed. It is possible to obtain high pneumatic or hydraulic pressures in short intervals of time, and in order to protect installations, safety valves must be designed to react within an equivalent space of time.

The principal object of this invention is to provide a pneumatic or hydraulic safety valve that will react immediately and effectively when a predetermined pressure has been established.

Another object of this invention is to provide a pneumatic or hydraulic safety valve that may have the component structures so arranged as to be able to react to virtually any excess pressure that may be imposed thereon.

A yet further object of this invention is to provide a hydraulic or pneumatic safety valve that may begin to react to an initial predetermined pressure and fully release excessive pressures when a second predetermined pressure is established.

A further object of this invention is to provide a pneumatic or hydraulic safety valve that has associated therewith a brake for arresting the movement of said safety valve in order to protect related equipment when the valve reacts to release excessive pressures.

A yet further object of this invention is to provide a hydraulic or pneumatic safety valve that has associated therewith a brake, and associated with the latter is structure for arresting movement of the brake, in order that the safety valve and brake may not be damaged due to the prevailing conditions existing when excessive pressures are released.

Another object of this invention is to provide a pneumatic or hydraulic safety valve that may be readily fabricated, easily assembled and maintained and suitable for mass production techniques.

Figure 1 is a fragmentary perspective view illustrating and having embodied therein the present invention.

Figure 2 is a side elevation view illustrating the configuration of the present invention and relationship of various component elements.

Figure 3 is a cross-sectional view similar to Figure 1 but illustrating in greater detail the safety valve per se.

Referring to the drawings for a more detailed description of the present invention, 10 designates a hollow, cylindrical body open at both ends. One end 12 is externally threaded for attaching the body 10 to a bracket, supporting plate, or other equally applicable equipment. The end 14 of the body 10 in opposed relation to end 12 has a pair of notches 16 therein. Intermediate the ends 12 and 14 of the body 10 are two pairs of opposed openings 18 and 20. The openings 18 have for their purpose the exhausting of excess fluid.

Reciprocably located in the body 10 is an assembly broadly designated 22. An elongated rod 24, being part of the assembly, is threaded on both ends 26 and 28. A piston 30 and jam nut 32, the latter locking piston 30 in the desired position on rod 24, is threaded on end 26. Circumscribing the piston 30, positioned within a groove formed therein, is a sealing ring 34.

A frusto-conical cam 36 with a nut 38 welded thereto is threaded on end 28.

The rod 24 is also threaded intermediate the ends to receive a pair of spaced apart nuts 40 and 42.

Extending into body 10, between openings 18 and 20 and spaced from rod 24, in the manner illustrated in Figures 1 and 3 inclusive, are a plurality of stop pins 44.

Slidable on rod 24, located between nut 40 and stop pins 44 and held in contacting relationship with the latter by nut 40, is a washer 46.

It may be seen by referring to Figures 1 and 3 that the changing of position of the nut 40 on rod 24 alters the position of the piston 30 with relation to the end 12 of body 10.

Also slidable on rod 24, held in contacting relationship with nut 42 by compression spring 48, is a washer 50 that functions as a stop or retainer for the compression spring 48, and adjacent cam 36 is a third washer 52 that functions in the same manner and for substantially the same purpose as washer 50. A spacer 54 is secured to washer 52 to maintain the cam 36 and washer in proper relationship.

On the exterior side of body 10, extending from openings 20 to the cam 36, are a pair of opposed, elongated arms 56. Each arm 56 has a projection 58 that is received in openings 20, and each arm has a finger 60, intermediate the ends, that is received in notches 16. When the arms 56 are in the positions illustrated in Figures 1 to 3 inclusive, the fingers 60 bear against the washer 52 and retain the spring 48 in a compressed condition. Arms 56 also have projections 62 that ride or rest on cam 36.

Attention is directed to the fact that nut 42 may have its position changed to increase or decrease the force or energy that may be stored in the spring 48. The position of cam 36 and nut 38 may be altered in relation to projections 62.

The brake, broadly designated 64 and shown in Figure 1, has as a component part a mounting plate 66. A hollow, cylindrical housing 68, one end being open and one end being closed by a circular disc 70, is secured to the plate 66. Compression springs 74 are attached to the disc 70 by fasteners 72. A second disc 76 is reciprocable in housing 68 and held spaced from disc 70 by the springs 74 being attached to it.

Secured to the exterior of housing 68 are flat, leaf springs 78 that have on one end thereof detents 80 that are received in and project through openings in the housing 68. The detents 80 rest on disc 76 when the latter is in the position illustrated in Figure 1 of the drawings.

The operation of the invention is as follows: Assume the body 10 to be suitably mounted. Adjusting nut 40 will determine the position the piston assumes in the body 10. Also in the absence of changing the position of the cam 36 and nut 38, the adjusting of the nut 40 will determine the position of the cam relative to the projections 62 on arms 56. However, as indicated the cam 36 and nut 38 may be further adjusted, if desired.

Assume the piston 30 to be in the position illustrated in Figures 1 and 3.

The tension imposed on spring 48 may be governed by the position of nut 42. Therefore, whatever energy is stored in spring 48 must be overcome by the fluid acting upon the piston 30.

The projections 58 of arm 56 are positioned in openings 20 and the fingers 60 are caused to bear against washer 52 in the manner illustrated in Figures 1 and 3. The projections 62 rest upon cam 36.

When the fluid acting on piston 30 exceeds the force imposed on rod 24, by the spring 48, the assembly 24 moves gradually in the direction of the brake 64 resulting in the cam 36 causing the arms 56 to spring apart. As the arms 56 spread apart the fingers 60 thereon release the spring and the force on the rod is released at the same time. As a result the assembly 22 travels toward and strikes disc 76. Disc 76 under the imposed force travels toward disc 70 resulting in releasing detents 80 which drop through the openings provided and arrest the movement of the disc 76 on the return path of travel.

Further, the disc 76 restrained by springs 74 prevents piston 30 striking stop pins 44. However, the piston 30 does uncover or expose openings 18 to the fluid acting thereon to reduce the excess pressure.

The arms 56 fall free of the body 10 when the assembly is released. However, they may be pivotally connected to the body if desired.

It may be seen that by setting spring 48 for a particular value a predetermined value of fluid pressure is required before the assembly will begin to function. Further, by properly positioning the cam 36 on the rod 24 a second predetermined pressure must be exceeded before the assembly 22 will release the excess pressure.

The fluid force imposed on assembly 22 and the velocity obtained when it is released determines whether the brake 64 may be dispensed with or not. If the safety valve is to be used in a low pressure installation then the brake 64 is not necessary. The stop pins 44 may function as a means of arresting the piston. On the other hand if the safety valve is to be utilized in a high pressure installation then the brake should be made use of in order to protect the safety valve against any damage.

While in order to comply with the statute the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A pressure relief valve comprising: a casing having an inlet adapted to be placed in communication with the pressure to be relieved and an outlet for escape of relieving fluid; valve means in said casing controlling communication between said inlet and said outlet and movable between open and closed positions, said valve means being exposed to pressure in said inlet and urged thereby toward said open position; spring means engaged with said valve means and urging the latter toward said closed position; and detent means engaged with said spring means and operable by a predetermined movement of said valve means toward said open position to release said spring means from said valve urging engagement.

2. A pressure relief valve comprising: a casing having an inlet adapted to be placed in communication with the pressure to be relieved and an outlet for escape of relieving fluid; valve means in said casing controlling communication between said inlet and said outlet and movable between open and closed positions, said valve means being exposed to pressure in said inlet and urged thereby toward said open position; means engaged with said valve means and resisting opening movement thereof with a force that increases with increasing opening movement; and means responsive to a predetermined extent of opening movement of said valve means for rendering said resisting means inoperative.

3. The structure defined in claim 2, in which the resisting means comprises a compression spring having one end thereof engaged with the valve means, and the responsive means comprises detent means engaged with the other end of said spring.

4. The structure defined in claim 2, including energy-absorbing means spaced from the valve means in position to be impacted by and to arrest the velocity of said valve means after said resisting means is rendered inoperative.

5. A pressure relief valve comprising: an open-ended tubular casing adapted to have one end thereof connected to the fluid pressure to be relieved and having a side outlet; a valve member reciprocable in said one end and urged by said fluid pressure toward said outlet; stem means on said valve member; detent means carried by said casing and having fingers extending radially thereinto; spring means engaged with said stem means and with said fingers for resisting movement of said valve means toward said outlet; and cam means on said stem means operative on a predetermined extent of movement of the latter in a valve-opening direction to engage said detent means and move said fingers out of engagement with said spring means.

References Cited in the file of this patent

UNITED STATES PATENTS

| | | |
|---|---|---|
| 1,669,534 | Rabitz | May 15, 1928 |
| 1,962,740 | Jaworowski | June 12, 1934 |